United States Patent
Shinmi et al.

(10) Patent No.: US 6,956,713 B2
(45) Date of Patent: Oct. 18, 2005

(54) MAGNETIC TAPE APPARATUS WITH CAPSTAN MOTOR CONFIGURATION

(75) Inventors: Tsukasa Shinmi, Osaka (JP); Yoshio Higuchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 181 days.

(21) Appl. No.: 10/338,616

(22) Filed: Jan. 8, 2003

(65) Prior Publication Data

US 2003/0127552 A1 Jul. 10, 2003

(30) Foreign Application Priority Data

Jan. 9, 2002 (JP) .................................. 2002-000057 U

(51) Int. Cl.$^7$ ............................ G11B 19/20; H02K 5/16
(52) U.S. Cl. ........................ 360/85; 310/68 R; 318/138
(58) Field of Search .............................. 360/84, 85, 90, 360/95, 271.1, 271.7, 281.4, 281.5; 310/42, 67 R, 90, 254, 68 R; 318/138

(56) References Cited

U.S. PATENT DOCUMENTS

| | | | | |
|---|---|---|---|---|
| 4,471,393 A | * | 9/1984 | Ishigo et al. | 360/90 |
| 5,815,339 A | * | 9/1998 | Inui et al. | 360/85 |
| 5,821,654 A | * | 10/1998 | Woo | 310/90 |
| 6,002,189 A | * | 12/1999 | Oishi et al. | 310/179 |
| 6,049,147 A | * | 4/2000 | Sanada et al. | 310/42 |
| 6,421,210 B1 | * | 7/2002 | Higuchi | 360/271 |

FOREIGN PATENT DOCUMENTS

| | | |
|---|---|---|
| JP | 7-121975 | 5/1995 |
| JP | 9-322505 | 12/1997 |
| JP | 10-201207 | 7/1998 |
| JP | 10-336941 | 12/1998 |
| JP | 2000-166164 | 6/2000 |

OTHER PUBLICATIONS

Patent Abstracts of Japan, Publication No. 07–121975, Publication Date May 12, 1995 (2 pages).
Patent Abstracts of Japan, Publication No. 09–322505, Publication Date Dec. 12, 1997 (2 pages).
Patent Abstracts of Japan, Publication No. 10–201207, Publication Date Jul. 31, 1998 (2 pages).
Patent Abstracts of Japan, Publication No. 10–336941, Publication date Dec. 18, 1998, 2 pages.
Patent Abstracts of Japan, Publication No. 2000–166164, Publication date Jun. 16, 2000, 1 page.

* cited by examiner

*Primary Examiner*—Brina E. Miller
(74) *Attorney, Agent, or Firm*—Osha Liang LLP

(57) ABSTRACT

In a magnetic tape apparatus, a cylinder motor and a capstan motor are provided separately. A family processing is realized by fabricating a stator core of the capstan motor by using the same die which is used for fabricating a stator core of the cylinder motor. Each of attachment pieces is fitted into the corresponding one of recess portions provided at a flange-shaped attachment portion of a bearing holder and the inner end of the attachment piece is engaged with a rib provided at the flange-shaped attachment portion. The inner end portion of the attachment piece is screwed with the flange-shaped attachment portion.

5 Claims, 5 Drawing Sheets

PRIOR ART

PRIOR ART

MAGNETIC TAPE APPARATUS WITH CAPSTAN MOTOR CONFIGURATION

BACKGROUND OF THE INVENTION

1. Field of the Invention

The present invention relates to a magnetic tape apparatus, particularly to a magnetic tape apparatus having a cylinder motor for driving a rotation cylinder containing a magnetic head and around which a magnetic tape is wound and a capstan motor for driving a capstan which applies a feeding force to the magnetic tape.

2. Description of the Related Art

A conventional magnetic tape apparatus of this type is shown in FIG. 5. In this drawing, symbol C designates a tape cassette having a feed reel C1 and a winding reel C2. The feed reel C1 and the winding reel C2 are set on reel tables 1a and 1b, respectively. Reference numeral 2 designates a movable loading post 2 which is provided so as to draw a tape T from the tape cassette C and winds the tape around a rotation cylinder 3 containing a magnetic head therein. Reference numeral 4 designates an entire width erasing head, reference numeral 5 designates an audio erasing head and reference numeral 6 designates an audio control head. Reference numeral 7 designates a tape guide post being fixed, reference numeral 8 designates a tension post for applying a tension force to the tape T being loaded, reference numeral 9 designates a capstan for applying a running force to the tape T, reference numeral 10 designates a pinch roller, reference numeral 11 designates an arm, reference numeral 12 designates a supporting shaft of the arm and reference numeral 13 designates a rotation cam. The rotation cylinder 3 illustrated by a phantom line contains a magnetic head (not shown) therein and is rotated in one direction by a cylinder motor 20. The capstan 9 is rotated in one direction by a capstan motor 30.

In the conventional magnetic tape apparatus which is separately provided with the cylinder motor 20 and the capstan motor 30, the cylinder motor 20 has a relatively large circular opening 22 at the center portion of a stator core 21. The circular opening 22 defines a space for disposing a constituent part of the cylinder motor 20, for example, a disk-shaped pressurizing member for pressurizing a bearing member which supports a rotation shaft of the rotation cylinder 3. Incidentally, a reference numeral 23 designates a rotor of the cylinder motor 20.

On the other hand, the capstan motor 30 includes a stator core 31 and a bearing holder 41 which are configured as illustrated in FIGS. 6 to 8. As shown in FIG. 6, the bearing holder 41 is formed by a cylindrical resin mold member for holding a bearing 42 formed by oil-bearing metal therein and is provided with a flange-shaped attachment portion 43 which is disposed concentrically. At each of three portions disposed with the same angular interval along the circumferential direction of the flange-shaped attachment portion 43, a recess portion 44 is formed such that the width thereof becomes smaller toward the center of the bearing holder 41. In contrast, the stator core 31 is provided with three plate-shaped attachment pieces 32 which are disposed with the same angular interval along the circumferential direction of the stator core and each of which extends inward toward the center of the stator core such that the width thereof becomes smaller toward the center of the stator core. As shown in FIG. 6, each of the attachment pieces 32 is fitted into the corresponding one of the recess portions 44 of the flange-shaped attachment portion 43 such that the attachment piece 32 fitted into the recess portion 44 is sandwiched by both side wall surfaces 45, 45 forming the corresponding recess portion 44, whereby the stator core 31 is positionally restricted in the circumferential direction thereof with respect to the bearing holder 41. An arc-shaped inner end 33 of each of the attachment pieces 32 engages with the outer peripheral surface 46 of the bearing holder 41, so that the stator core 31 is positionally restricted in the radial direction thereof with respect to the bearing holder 41. The flange-shaped attachment portion 43 and the attachment pieces 32 positionally restricted in the circumferential and radial directions thereof in this manner are coupled by means of attachment screws 35 which are respectively inserted into screw insertion holes 47 provided at the flange-shaped attachment portion 43 and screwed into screw holes 34 provided at the inner end portions of the attachment pieces 32.

In the aforesaid conventional magnetic tape apparatus, since the cylindrical-shaped bearing holder 41 is molded by composite resin, if the thickness of the bearing holder 41 is made too large, a so-called sink mark or sink due to the molding is likely generated, so that the accuracy of the size and appearance of the bearing holder may be degraded. Thus, the enlargement of the diameter of the outer periphery of the bearing holder 41 is limited. Further, since the stator core 31 of the capstan motor 30 is required to be attached to the bearing holder after positioning the stator core concentrically with respect to the bearing holder 41, the inner end 33 of each of the attachment pieces 32 is made engage with the outer peripheral surface 46 of the bearing holder 41 thereby to positionally restrict the stator core in the radial direction thereof.

In the aforesaid conventional magnetic tape apparatus, same plate-shaped metal member is used for the stator core 31 of the capstan motor 30 and the stator core 21 of the rotation cylinder 3. Thus, if the diameter size d1 of a phantom circle "a" shown in FIG. 9 formed by the inner ends 33 of the three attachment pieces 32 provided at the stator core 31 of the capstan motor 30 can be made equal to the diameter size D of the circular opening 22 provided at the stator core 21 of the rotation cylinder 3 explained with reference to FIG. 5, the common die can be employed for the stamping process used at a portion surrounded by the phantom line "a" on the stator core 31 side of the capstan motor 30 and for the stamping process used at the circular opening 22 on the stator core 21 side of the rotation cylinder 3, whereby manufacturing cost can be suppressed. In other words, a so-called family processing becomes possible that the portion surrounded by the phantom line "a" and the circular opening 22 are stamped using the same die, which results in the suppression of the manufacturing cost.

On the other hand, JP-A-10-336941 discloses such a structure that the inner peripheral surface of a circular opening of a stator core fitted into a bearing holder is overlapped on the outer peripheral surface of the bearing holder.

Further, JP-A-2000-166164 discloses a motor for rotationally driving a disk in which a stator core is attached to a bearing holder. A core holder is fixed to the bearing holder. The stator core is overlapped on the core holder and they are coupled to each other via a U-shaped stopper.

In the conventional magnetic tape apparatus, the enlargement of the diameter of the outer periphery of the bearing holder 41 is restricted in a viewpoint of the molding technique. Further, since such a configuration is employed that the inner end 33 of each of the attachment pieces 32 is made engage with the outer peripheral surface 46 of the bearing holder 41 thereby to positionally restrict the stator core in the radial direction thereof, the diameter size d1 of the phantom circle "a" on the stator core 31 side of the capstan motor 30 is required to be shorter than the diameter size D of the circular opening 22 on the stator core 21 side of the rotation cylinder 3. As a result, there arise a problem that the suppression of the manufacturing cost employing the aforesaid family processing can not be realized.

Since JP-A-10-336941 employs the structure that the inner peripheral surface of the circular opening of the stator core is overlapped on the outer peripheral surface of the bearing holder thereby to positionally restrict them concentrically, the aforesaid problem of the conventional magnetic tape apparatus can not be solved.

Further, JP-A-2000-166164 has a problem that the stopper is additionally required and so the number of parts increases, which impede the reduction of the manufacturing cost.

SUMMARY OF THE INVENTION

An object of the present invention is to provide a magnetic tape apparatus which can easily attach a stator core of a capstan motor to a bearing holder concentrically without increasing the thickness of the bearing holder, even if the reduction of the manufacturing cost by applying a family processing becomes possible by making a diameter size of a phantom circle formed by the inner ends of plural attachment pieces provided at the stator core of the capstan motor equal to a diameter size D of the circular opening 22 provided at the stator core 21 of the rotation cylinder 3 explained with reference to FIG. 5.

Another object of the present invention is to provide a magnetic tape apparatus which can attach the stator core of the capstan motor to the bearing holder without using an additional part such as a stopper as disclosed in JP-A-2000-166164, whereby the reduction of the manufacturing cost can be easily realized.

A magnetic tape apparatus according to the invention is separately provided with a cylinder motor for driving a rotation cylinder containing a magnetic head and around which a magnetic tape is wound and a capstan motor for driving a capstan which applies a feeding force to the magnetic tape. The capstan motor has a cylindrical bearing holder to which a capstan stator core is attached and a rotor which is attached to the bearing holder through a bearing, the capstan stator core has a plurality of plate-shaped attachment pieces each of which extends inward toward a center of the stator core, and the attachment pieces are respectively fitted into recess portions which are provided at plural portions in a circumferential direction of a flange-shaped attachment portion provided concentrically at the bearing holder. Each of the attachment piece fitted into the recess portion is sandwiched by both side wall surfaces defining the corresponding recess portion so that the stator core of the capstan motor is positionally restricted in the circumferential direction thereof with respect to the bearing holder.

A diameter size of a phantom circle formed by inner ends of the plurality of attachment pieces provided at the capstan stator core is larger than an outer peripheral diameter size of the bearing holder and same as a diameter size of a circular opening provided at a center portion of the stator core of the cylinder motor, and the flanged-shaped attachment portion is provided with engagement surfaces which are positioned at outer periphery of the bearing holder and engage with the inner ends of the attachment pieces fitted into the recess portions thereby to positionally restrict the capstan stator core in a radial direction thereof with respect to the bearing holder.

According to the invention, since a diameter size d of the phantom circle formed by the inner ends of the plural attachment pieces provided at the capstan stator core is same as the diameter size of the circular opening provided at the stator core of the cylinder motor, a family processing becomes possible that the portion surrounded by the phantom line and the circular opening are stamped by using the same die, whereby the manufacturing cost can be suppressed. Further, the diameter size of the phantom circle is larger than the outer peripheral diameter of the bearing holder. Thus, when the bearing holder is formed by a composite resin molding process, the thickness of the bearing holder can be suppressed to a value not causing a sink mark, so that the accuracy of the size and appearance is kept in a good state. Further, the engagement surfaces which are provided at the flange-shaped attachment portion and positioned at the outer periphery of the bearing holder respectively engage with the inner ends of the attachment pieces fitted into the recess portions of the flange-shaped attachment portion thereby to positionally restrict the stator core of the capstan motor in the radial direction thereof with respect to the bearing holder. Thus, the stator core can be disposed concentrically with respect to the bearing holder by such an action of the engagement surfaces and an action that the both side wall surfaces of the recess portion of the flange-shaped attachment portion sandwich the attachment piece therebetween.

According to the invention, preferably, the engagement surface is formed by the outer side surface of a rib extended between the both side wall surfaces forming the corresponding recess portion, and the rib is cut out at its intermediate portion. According to such a configuration, the stator core can be positionally restricted surely in the radial direction with respect to the bearing holder without deforming the engagement surfaces. Further, since the rib is cut out at its intermediate portion, advantageously, the plural attachment pieces are fitted easily to the outer side of the corresponding rib.

According to the invention, preferably, each of the attachment pieces is formed to extend inward toward a center of the stator core such that a width thereof becomes smaller toward the center of the stator core, the attachment pieces are respectively fitted into the recess portions which are provided at the plural portions in the circumferential direction on a rear side of the flange-shaped attachment portion provided concentrically at the bearing holder, and each of the recess portions is directed toward the center of the stator core such that a width thereof becomes smaller toward the center. According to such a configuration, in relation to that the diameter size of the phantom lime formed by the inner ends of the plural attachment pieces is longer than the conventional case explained with reference to FIG. 9, the screwing portion is positioned away from the center of the bearing holder, so that the stability of the screwing operation can be improved. In this disclosure, a rear side or a rear surface means a bottom surface of flange-shaped attachment portion 43 of FIG. 2.

The following configuration describes another embodiment of the invention. That is, the magnetic tape apparatus comprising: a rotation cylinder around which a magnetic tape is wound, the rotation cylinder containing a magnetic head; a cylinder motor for driving the rotation cylinder, the cylinder motor having a stator core; a capstan for applying a feeding force to the magnetic tape; and a capstan motor for driving the capstan, the capstan motor having a capstan stator core, a cylindrical bearing holder to which the capstan stator core is attached and a rotor attached to the bearing holder through a bearing, wherein the bearing holder has a concentric flange-shaped attachment portion and recess portions arranged at predetermined intervals in a circumferential direction on a rear surface of the flange-shaped attachment portion, each of the recess portions is directed toward a center of the stator core such that a width thereof becomes smaller toward the center, the capstan stator core has a plurality of plate-shaped attachment pieces each of which extends inward toward the center such that a width thereof becomes smaller toward the center, the attachment pieces are respectively fitted into the recess portions and sandwiched by both side wall surfaces defining the corresponding recess portion so that the capstan stator core is positionally restricted in a circumferential direction thereof with respect to the bearing holder, the flange-shaped attachment portion and the attachment pieces are coupled by screws which are respectively inserted into screw insertion holes provided at the flange-shaped attachment portion and screwed into screw holes provided at inner end portions of the attachment pieces, the stazor core of the cylinder motor has a circular opening at a center thereof, a diameter size of a phantom circle formed by inner ends of the plurality of attachment pieces is larger than an outer peripheral diameter size of the bearing holder and same as a diameter size of the circular opening, the flange-shaped attachment portion has ribs extended between the both side wall surfaces and positioned at outer periphery of the bearing holder and engage with the inner ends of the attachment pieces fitted into the recess portions thereby to positionally restrict the capstan stator core in a radial direction thereof with respect to the bearing holder, and an intermediate portion of each rib is cut out.

According to such a configuration, an engaging width of the ribs with respect to the inner end of each of the attachment pieces is made wider as compared with the engaging width where each of the attachment pieces is made engaged with the outer peripheral surface of the bearing holder. Thus, the stability of the positional restricting function in the radial direction can be improved by the length being made wider. Further, the workability at the time of attaching the capstan stator core to the bearing holder can be improved.

DETAILED DESCRIPTION OF THE PREFERRED EMBODIMENTS

Figure 1:
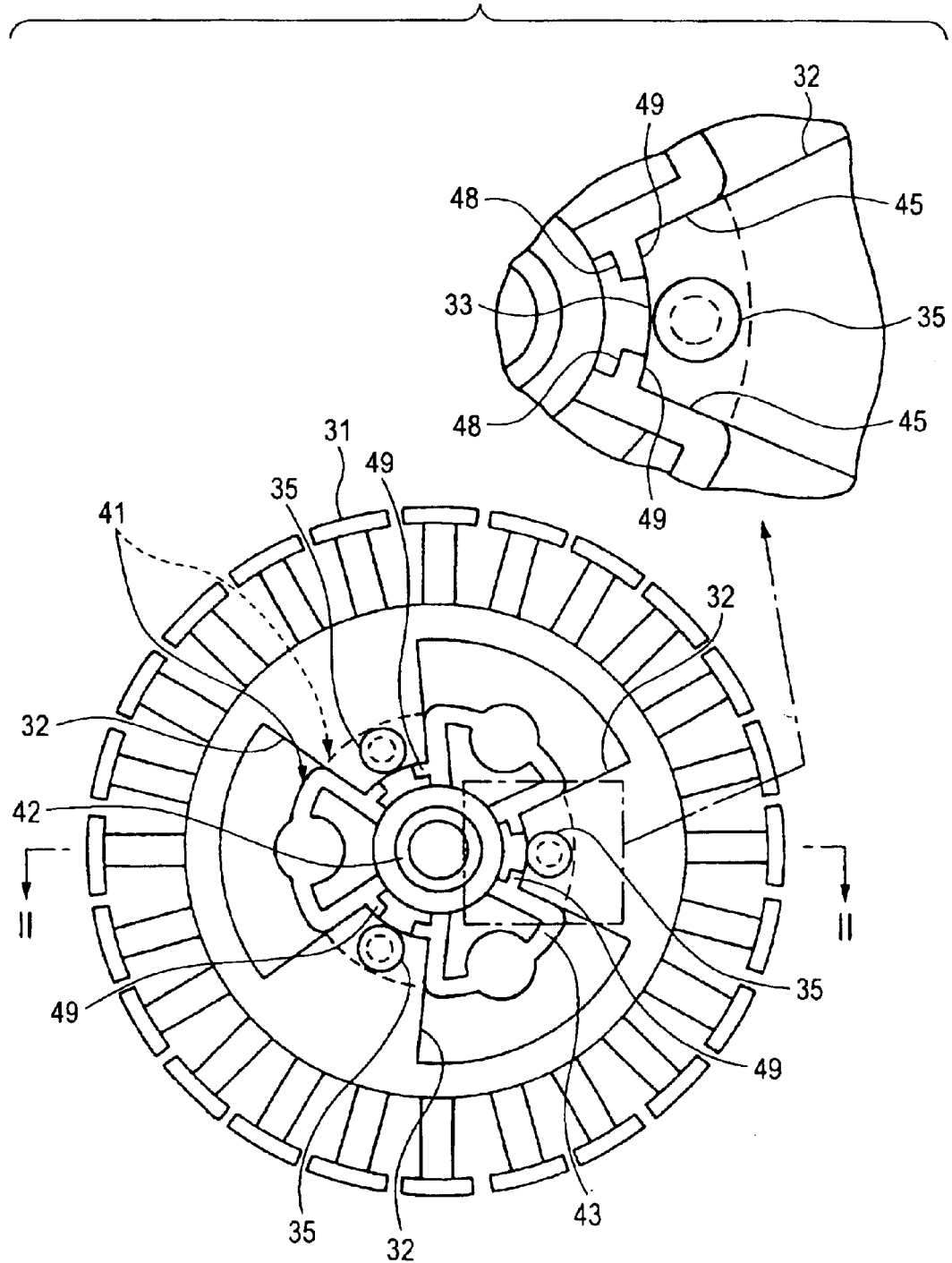
FIG. 1 is a plan view showing a stator core etc. of a capstan motor employed in a magnetic tape apparatus according to the invention.
Figure 2:
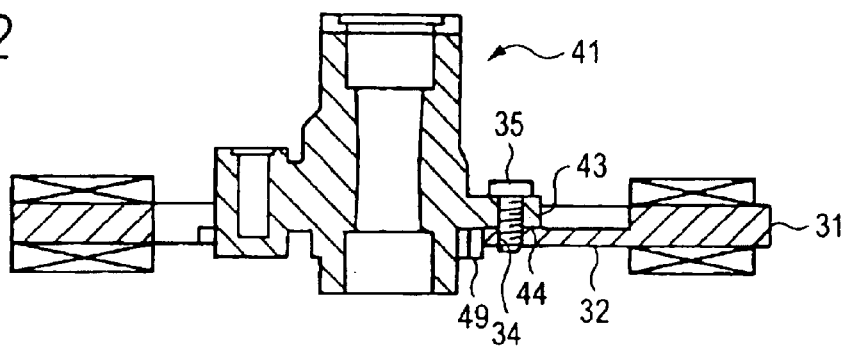
FIG. 2 is a schematic sectional view taken along a line II—II in FIG. 1.
Figure 3:
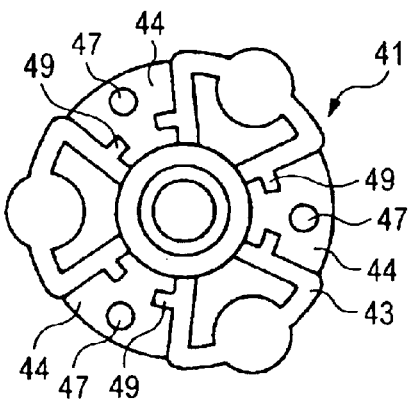
FIG. 3 is a plan view of a bearing holder shown in FIG. 1.
Figure 4:
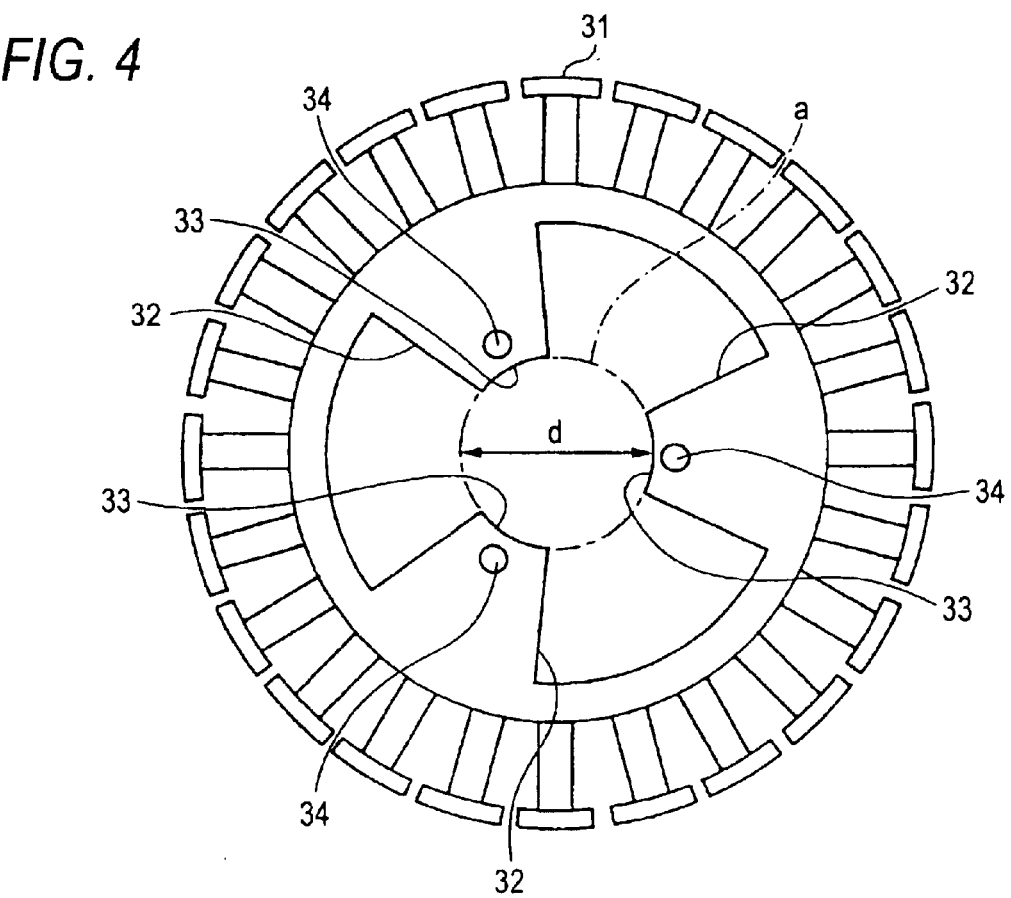
FIG. 4 is a plan view of the stator core shown in FIG. 1.

FIG. 1 is a plan view showing a stator core and a bearing holder of a capstan motor employed in a magnetic tape apparatus according to the invention, FIG. 2 is a schematic sectional view taken along a line II—II in FIG. 1, FIG. 3 is a plan view showing the bearing holder, and FIG. 4 is a plan view showing the stator core.

Figure 5:
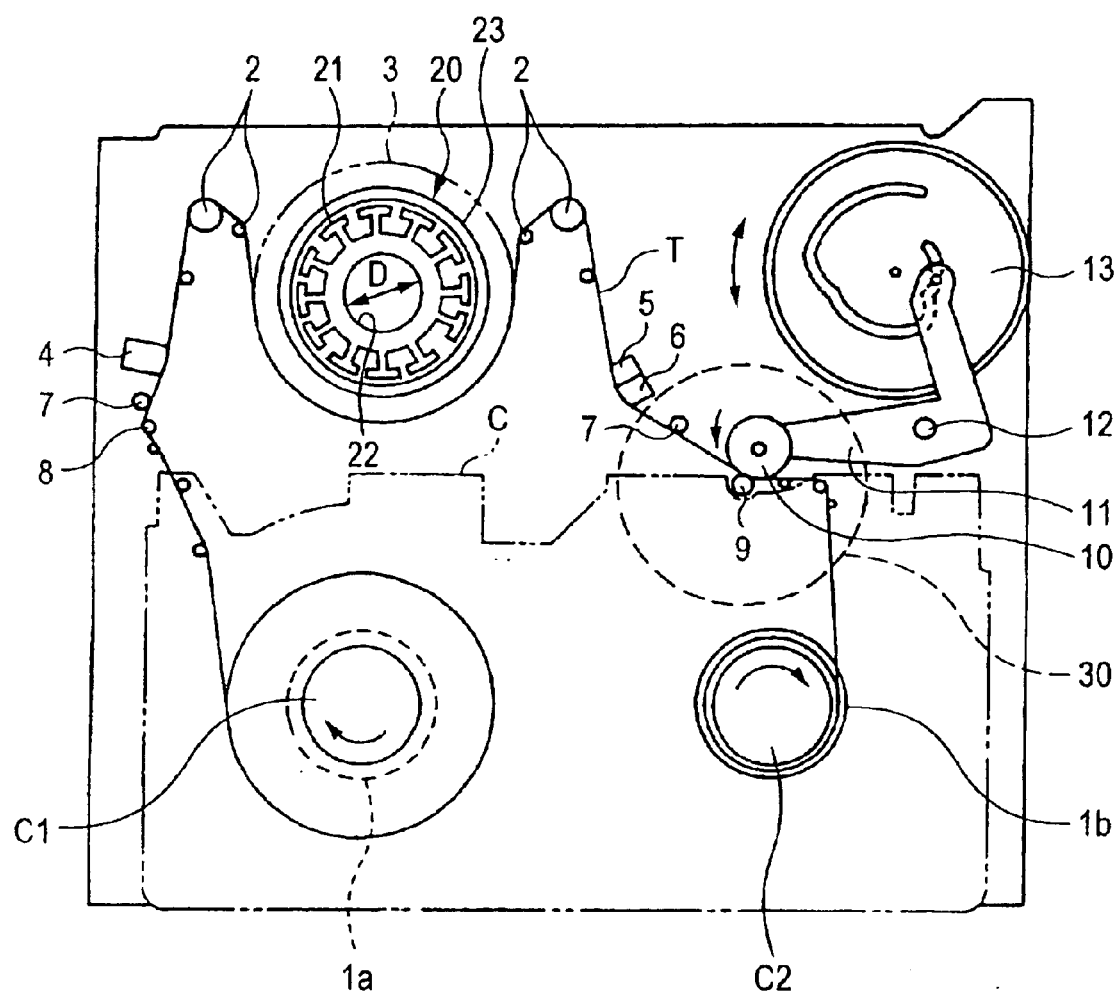
FIG. 5 is a schematic diagram showing a configuration of a magnetic tape apparatus.

The magnetic tape apparatus according to the embodiment is separately provided with a cylinder motor 20 and the capstan motor 30, like the case explained in FIG. 5. The cylinder motor 20 has a relatively large circular opening 22 at the center portion of a stator core 21. The circular opening 22 defines a space for disposing a constituent part of the cylinder motor 20, for example, a disk-shaped pressurizing member for pressurizing a bearing member which supports the rotation shaft of the rotation cylinder 3.

On the other hand, the capstan motor 30 (see FIG. 5) employed in the magnetic tape apparatus according to the embodiment includes a stator core 31 and a bearing holder 41 which are configured as illustrated in FIGS. 1 to 3, and further includes a not-shown rotor etc., and a capstan 9 (see FIG. 5) is coupled to the rotor. As shown in FIG. 1, the bearing holder 41 is formed by a cylindrical resin mold member for holding a bearing 42 formed by oil-bearing metal therein and is provided with a flange-shaped attachment portion 43 which is disposed concentrically. At each of three portions disposed with the same angular interval along the circumferential direction of the flange-shaped attachment portion 43, a recess portion 44 is formed so as to be directed toward the center thereof such that the width thereof becomes smaller toward the center. In contrast, the stator core 31 is provided with three plate-shaped attachment pieces 32 which are disposed with the same angular interval along the circumferential direction of the stator core and each of which extends inward toward the center of the stator core such that the width thereof becomes smaller toward the center of the stator core. As shown in FIG. 1, each of the attachment pieces 32 is fitted into the corresponding one of the recess portions 44 of the flange-shaped attachment portion 43 such that the attachment piece 32 fitted into the recess portion 44 is sandwiched by both side wall surfaces 45, 45 defining the recess portion 44, whereby the stator core 31 is positionally restricted in the circumferential direction thereof with respect to the bearing holder 41. An arc-shaped inner end 33 of each of the attachment pieces 32 engages with an engagement surface 49 formed by the arc-shaped outer side surface of a rib 48 extended between the both side wall surfaces 45, 45, so that the stator core 31 is positionally restricted in the radial direction thereof with respect to the bearing holder 41. The rib 48 is partially removed at its intermediate portion.

The flange-shaped attachment portion 43 and the attachment pieces 32 positionally restricted in the circumferential and radial directions thereof in this manner are coupled by means of attachment screws 35 which are respectively inserted into screw insertion holes 47 provided at the flange-shaped attachment portion 43 and screwed into screw holes 34 provided at the inner end portions of the attachment pieces 32.

The stator core 31 differs from the conventional stator core 31 explained with reference to FIGS. 6 to 9 in a point that the diameter size d of a phantom circle "a" shown in FIG. 4 formed by the inner ends 33 of the three attachment pieces 32 is the same as the diameter size of the circular opening 22 of the stator core 21 of the cylinder motor 3 shown in FIG. 5 and larger than the outer peripheral diameter of the cylindrical-shaped bearing holder 41. Further, the bearing holder 41 differs from the conventional bearing holder 41 explained with reference to FIGS. 6 to 9 in a point that the ribs 48 are additionally provided and the engagement surface 49 is formed by the arc-shaped outer side surface of the rib 48. Other features of the stator core 31 and the bearing holder 41 are same as those explained with reference to FIGS. 6 to 9 and so like parts corresponding to those of FIGS. 6 to 9 are marked with the same references.

In this embodiment, since the diameter size d of the phantom circle "a" formed by the inner ends of the three attachment pieces 32 provided at the stator core 31 of the capstan motor 30 is the same as the diameter size of the circular opening 22 provided at the stator core 21 of the cylinder motor 3, a family processing becomes possible that the portion surrounded by the phantom line "a" and the circular opening 22 are stamped by using the same die, whereby the manufacturing cost can be suppressed. Further, since the outer peripheral diameter of the cylindrical-shaped bearing holder 41 formed by the composite resin molding member is made shorter than the diameter size d of the phantom circle "a", the thickness of the bearing holder 41 can be suppressed to a value not causing a sink mark, so that the accuracy of the size and appearance is kept in a good state.

Figure 6:
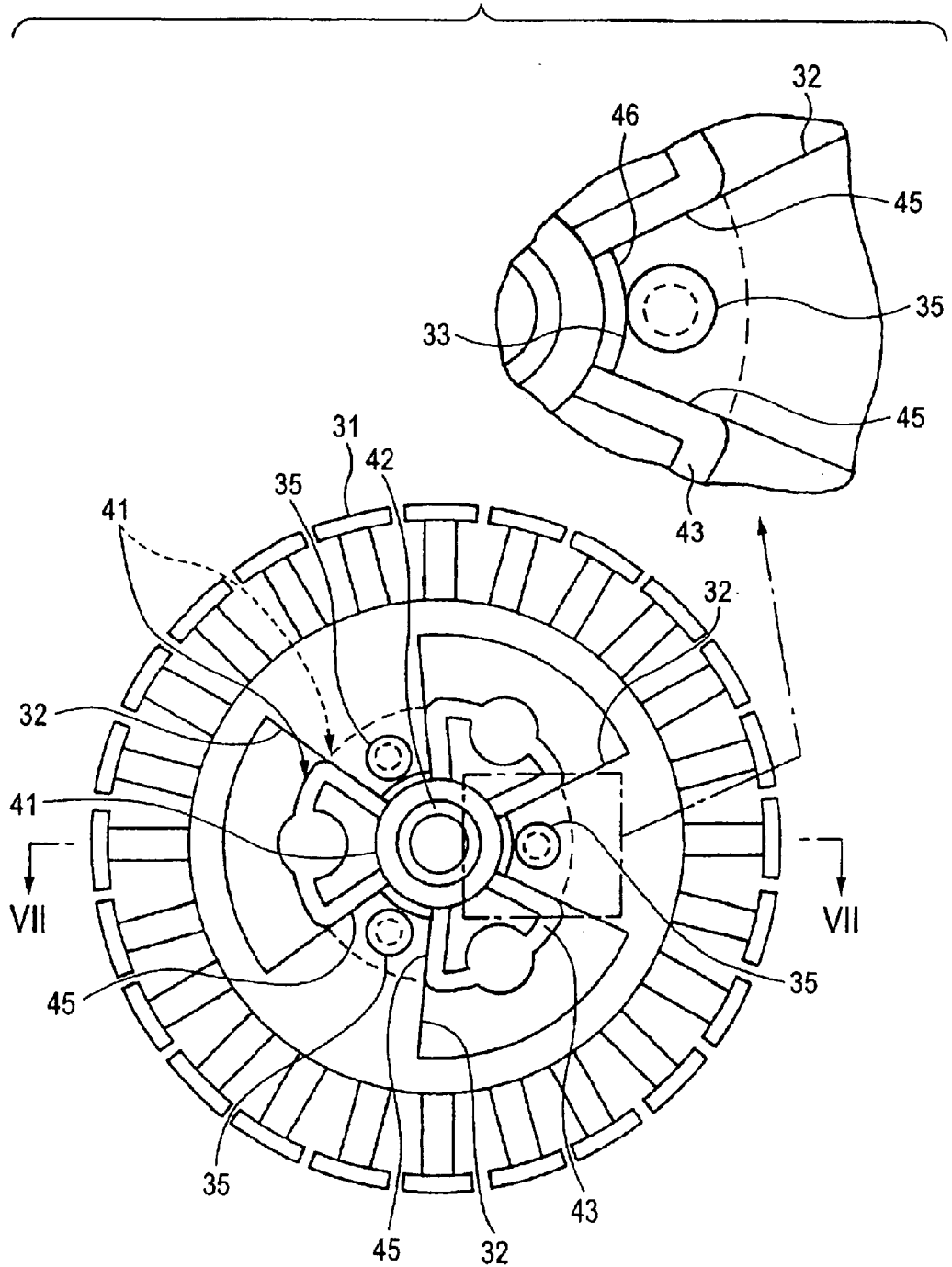
FIG. 6 is a plan view showing a stator core etc. of a capstan motor employed in a conventional magnetic tape apparatus.
Figure 7:
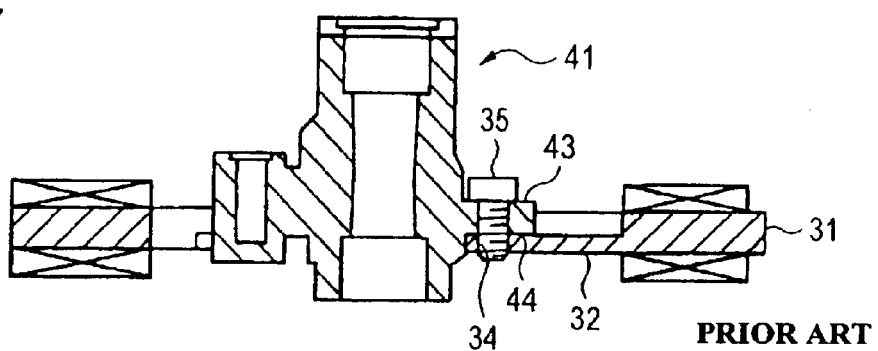
FIG. 7 is a schematic sectional view taken along a line VII in FIG. 6.
Figure 8:
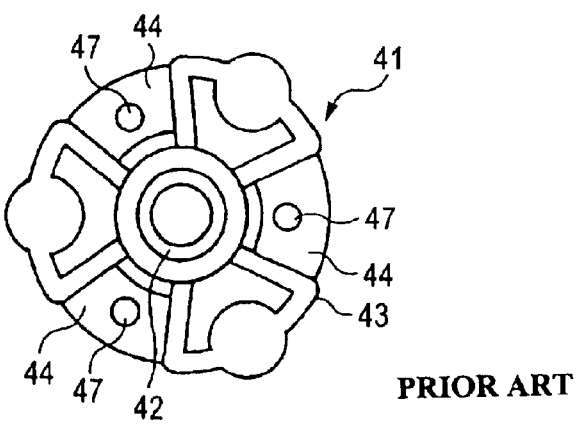
FIG. 8 is a plan view of a bearing holder shown in FIG. 6.
Figure 9:
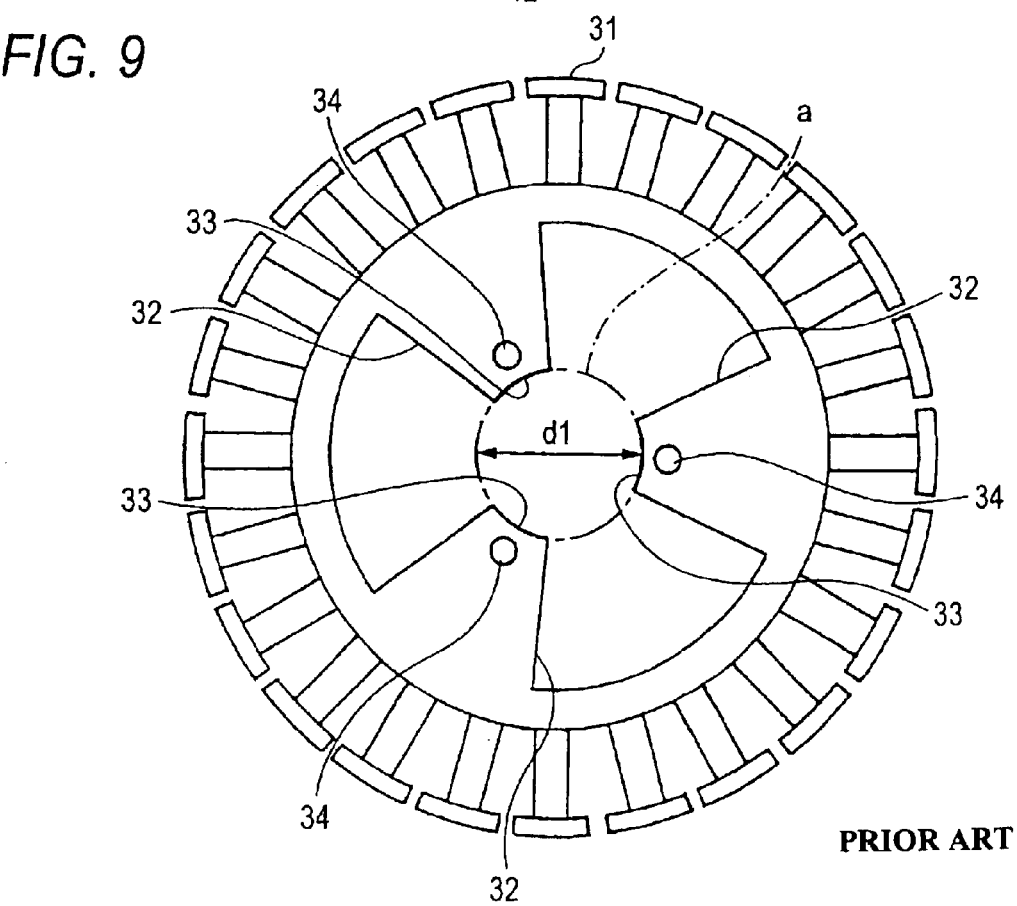
FIG. 9 is a plan view of the stator core shown in FIG. 6.

Further, the engaging width of the engagement surface 49 with respect to the arc-shaped inner end 33 of each of the three attachment pieces 32 is made wider as compared with the engaging width where each of the attachment pieces 32 is made engaged with the outer peripheral surface of the bearing holder 41 as explained with reference to FIG. 6 as the conventional example. Thus, the stability of the positional restricting function in the radial direction can be improved. Further, the workability at the time of attaching the stator core 31 to the bearing holder 41 can be improved. Furthermore, since the length of the attachment piece 32 is made shorter than that of the conventional example, the screwing portion using the attachment screw 35 is positioned on the outer side of the flange-shaped attachment portion 43 in the radial direction and so positioned away from the center of the bearing holder 41 as compared with the conventional example, so that the screwing operation can be made more surely and stably.

Further, since the rib 48 is partially removed at its intermediate portion, each of the three attachment pieces 32 can be easily fitted on the outer side of the corresponding rib 48, so that the fitting operation of the attachment piece 32 with respect to the recess portion 44 is facilitated.

Although the embodiment is explained as to the case where the stator core 31 has the three attachment pieces 32, the number of the attachment pieces 32 may be two or more than three. Further, each of the attachment piece 32 and the recess portion 44 may not necessarily be configured such that the width thereof becomes smaller toward the center.

As described above, according to the invention, since the diameter size of the phantom circle formed by the inner ends of the plural attachment pieces provided at the stator core of the capstan motor is made equal to the diameter size of the circular opening provided at the stator core of the rotation cylinder, a family processing of the respective stator cores can be made possible. Thus, the manufacturing cost can be reduced by applying the family processing and so the magnetic tape apparatus can be provided with a lower cost in corresponding to the cost reduction. In spite of this effect, it is not necessary to make the thickness of the bearing holder larger, and further the stator core of the capstan motor can be concentrically attached to the bearing holder easily and accurately. Thus, it is possible to provide at a low cost the magnetic tape apparatus which is excellent in the tape feeding performance of the capstan and in stability of an image.

What is claimed is:

1. A magnetic tape apparatus comprising: a rotation cylinder around which a magnetic tape is wound, the rotation cylinder containing a magnetic head; a cylinder motor for driving the rotation cylinder, the cylinder motor having a stator core; a capstan for applying a feeding force to the magnetic tape; and a capstan motor for driving the capstan, the capstan motor having a capstan stator core, a cylindrical bearing holder to which the capstan stator core is attached and a rotor attached to the bearing holder through a bearing, wherein the bearing holder has a concentric flange-shaped attachment portion and recess portions arranged at predetermined intervals in a circumferential direction on a rear surface of the flange-shaped attachment portion, each of the recess portions is directed toward a center of the stator core such that a width thereof becomes smaller toward the center, the capstan stator core has a plurality of plate-shaped attachment pieces each of which extends inward toward the center such that a width thereof becomes smaller toward the center, the attachment pieces are respectively fitted into the recess portions and sandwiched by both side wall surfaces defining the corresponding recess portion so that the capstan stator core is positionally restricted in a circumferential direction thereof with respect to the bearing holder, the flange-shaped attachment portion and the attachment pieces are coupled by screws which are respectively inserted into screw insertion holes provided at the flange-shaped attachment portion and screwed into screw holes provided at inner end portions of the attachment pieces, the stator core of the cylinder motor has a circular opening at a center thereof, a diameter size of a phantom circle formed by inner ends of the plurality of attachment pieces is larger than an outer peripheral diameter size of the bearing holder and same as a diameter size of the circular opening, the flange-shaped attachment portion has ribs extended between the both side wall surfaces and positioned at an outer periphery of the bearing holder and engage with the inner ends of the attachment pieces fitted into the recess portions thereby to positionally restrict the capstan stator core in a radial direction thereof with respect to the bearing holder, and an intermediate portion of each rib is cut out.

2. A magnetic tape apparatus comprising: a rotation cylinder around which a magnetic tape is wound, the rotation cylinder containing a magnetic head; a cylinder motor for driving the rotation cylinder, the cylinder motor having a stator core; a capstan for applying a feeding force to the magnetic tape; and a capstan motor for driving the capstan, the capstan motor having a capstan stator core, a cylindrical bearing holder to which the capstan stator core is attached and a rotor attached to the bearing holder through a bearing, wherein the bearing holder has a concentric flange-shaped attachment portion and recess portions arranged at predetermined intervals in a circumferential direction of the flange-shaped attachment portion, the capstan stator core has a plurality of plate-shaped attachment pieces each of which extends inward toward the center thereof, the attachment pieces are respectively fitted into the recess portions and sandwiched by both side wall surfaces defining the corresponding recess portion so that the capstan stator core is positionally restricted in a circumferential direction thereof with respect to the bearing holder, the stator core of the cylinder motor has a circular opening at a center thereof, a diameter size of a phantom circle formed by inner ends of the plurality of attachment pieces is larger than an outer peripheral diameter size of the bearing holder and same as a diameter size of the circular opening, and the flange-shaped attachment portion is provided with engagement surfaces which are positioned at an outer periphery of the bearing holder and engage with the inner ends of the attachment pieces fitted into the recess portions thereby to positionally restrict the capstan stator core in a radial direction thereof with respect to the bearing holder.

3. A magnetic tape apparatus according to claim 2, wherein each of the engagement surfaces is formed by an outer side surface of a rib extended between the both side wall surfaces, and an intermediate portion of each rib is cut out.

4. A magnetic tape apparatus according to claim 2, wherein each of the attachment pieces is formed to extend inward toward a center of the stator core such that a width thereof becomes smaller toward the center of the stator core, the attachment pieces are respectively fitted into the recess portions arranged at predetermined intervals in a circumferential direction on a rear surface of the flange-shaped attachment portion, and each of the recess portions is directed toward the center of the stator core such that a width thereof becomes smaller toward the center.

5. A magnetic tape apparatus according to claim 2, wherein the flange-shaped attachment portion and the attachment pieces positionally restricted in the circumferential direction thereof are coupled by screws which are respectively inserted into screw insertion holes provided at the flange-shaped attachment portion and screwed into screw holes provided at inner end portions of the attachment pieces.

\* \* \* \* \*